united States Patent Office 3,803,122
Patented Apr. 9, 1974

3,803,122
GREEN-YELLOW MONOAZO ACID DYES
Lindsay Kilmurry, Pennsville, N.J., assignor to E. I. du Pont de Nemours and Company, Wilmington, Del.
No Drawing. Filed Feb. 19, 1971, Ser. No. 117,111
Int. Cl. C09b 29/38; D06p 3/24
U.S. Cl. 260—163
3 Claims

ABSTRACT OF THE DISCLOSURE

Monoazo dyes having the structure

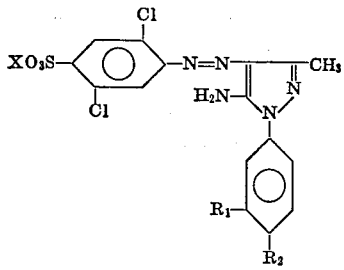

wherein X is H, an alkali metal, ammonium or a substituted ammonium and wherein one of $R_1$ and $R_2$ is Cl, the other being H. The dyes are useful, among other things, for dyeing nylon carpeting.

The dyes of this invention are bright, green-yellow, monoazo dyes of excellent tinctorial strength having good application and high-lightfastness characteristics on nylon and good shade stability under alkaline conditions.

BACKGROUND OF THE INVENTION (1) Field of the invention

This invention relates to novel green-yellow monoazo acid dyes which are particularly useful in the dyeing of nylon showing an unexpected degree of exhaust and buildup thereon while at the same time exhibiting excellent lightfastness.

(2) Description of the prior art

The commercial coloration of nylon fibers is effected almost entirely by three classes of dye; namely, acid, disperse and premetallized dyes. The choice of dye class depends on the end-use to which the nylon substrate is put. For many important end-uses, notably the dyeing of BCF (bulked continuous filament) nylon carpeting, acid dyes have the most desirable combination of properties. For example, premetallized dyes in general exhibit poor transfer (which is the ability to move from one site on the substrate to another during the dyeing process) on nylon and hence tend to produce unlevel shades, particularly if there are any irregularities in the yarn. For BCF nylon carpeting, which is dyed in widths up to 15 feet, levelness of shade (and thus good transfer) is critically important.

Disperse dyes exhibit the best transfer of the three dye classes and consequently produce the most level dyeings. However, acid dyes tend to have better fastness towards gaseous atmospheric contaminants such as nitrogen oxides an ozone, better wet-fastness and brighter shades than disperse dyes.

Levelness, however, is often a problem with acid dyes, which vary greatly in their ability to exhaust and to transfer on nylon. These properties are dependent on the acidity of the dyebath with, exhaust improving at the expense of transfer as the acidity increases. Generally, acid dyes are applied to nylon at a pH of about 3, in order to obtain efficient exhaust of the dye onto the substrate. However, in certain important end-uses, including BCF nylon carpeting, there are several reasons why a higher dyeing pH would be preferred.

(1) Good transfer is essential to obtain the desired levelness of shade.

(2) Much BCF nylon carpeting is backed with jute, which contains impurities which stain the nylon under acidic conditions. Such stains have an adverse effect on dye shade and fastness properties and may also promote unlevelness of shade. Staining by the jute backing is virtually eliminated under neutral to weakly acidic dyeing conditions (pH 6–7).

(3) BCF nylon styling yarns, which are being used increasingly in carpeting but which also find application in other areas such as upholstery, usually contain an "acid-modified" type of nylon which is dyed with basic dyes, in addition to two or more unmodified types of nylon which are dyeable with acid dyes. The exhaust of basic dyes on acid-modified synthetic fibers decreases with increasing dyebath acidity. Conversely, undesirable staining of the unmodified fibers by the basic dyes becomes apparent as the dyebath pH approaches neutrality and is unacceptably heavy under alkaline conditions. Such staining reduces the desired shade contrast between the modified and unmodified yarns.

For these and other reasons, acid dyes which may be applied to nylon under neutral to weakly acidic conditions (pH 6–7) are a desirable commodity. Very few art-known dyes have the necessary exhaust and transfer properties at this pH range, even with the help of leveling agents; fewer yet combine such application properties with the high degree of fastness required for such end-uses as nylon carpeting.

An additional consideration in the selection of a dye is the ability of the dye to impart the same shade to nylon fibers having different degrees of acid-dyeability. The differences in acid-dyeability of various types of nylon fibers are produced by varying their amine-end content; the higher the excess of amine end-groups over carboxylic acid end-groups, the more deeply dyeable with acid dyes the fibers become. However, those dyes containing an ionizable hydroxyl group (e.g. those containing phenolic coupling components) are normally found to change shade on certain "deep-dyeable" nylons, where the high population of amine groups renders such substrates quite basic in character.

The novel green-yellow monoazo acid dyes of this invention possess the desired properties. They are tinctorially strong and manifest good exhaust and transfer on BCF nylon under neutral to weakly acid conditions while at the same time exhibiting excellent lightfastness thereon and excellent shade stability under basic conditions.

SUMMARY OF THE INVENTION

The present invention comprises green-yellow monoazo acid dyes of the formula:

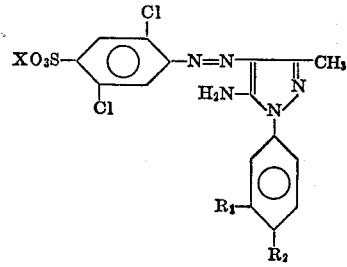

wherein X is H, an alkali metal, ammonium or a substituted ammonium and wherein one of $R_1$ and $R_2$ is Cl, the other being H.

DESCRIPTION OF THE INVENTION

The dyes of this invention are bright, green-yellow, monoazo dyes of excellent tinctorial strength having good application and high-lightfastness characteristics on nylon and good shade stability under alkaline conditions. They have the structure:

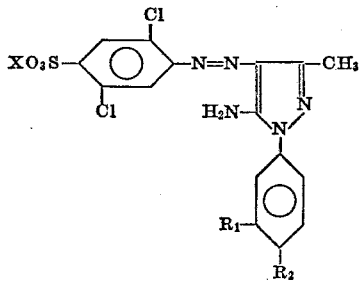

These dyes may be prepared by diazotizing 2,5-dichlorosulfanilic acid with sodium nitrite in dilute aqueous mineral acid (hydrochloric or sulfuric acid) at a temperature of from about 0° to about 25° C. The diazonium salt thus formed is then treated with or added to at least an equimolar amount of 3-alkyl-5-amino-1-(m- or p-chlorophenyl)-pyrazole in aqueous mineral acid at about 0° to about 25° C. at a pH of <1. The reaction may be accelerated by raising the pH to 2-3 with a suitable salt or base, such as sodium acetate or hydroxide, e.g. as in Example 1. If desired, other cations such as lithium, potassium or ammonium may be introduced by adding salts or bases of these radicals to adjust the pH of the reaction mixture. The salts or bases which may be used will be readily recognized by those skilled in the art, i.e., lithium carbonate, potassium acetate, ammonium hydroxide and the like.

When the reaction is complete, the product is isolated by filtration and purified, if desired, by washing, reslurrying or recrystallizing with a suitable solvent system (see e.g. Example 1).

If a pure form of the dye is required containing a cation other than sodium, the dye is best isolated as the free sulfonic acid by first rendering the reaction mass highly acidic with mineral acid. The solids may then be separated by filtration, washed thoroughly in water to remove inorganic salts, reslurried in water and treated with the carbonate or hydroxide of the desired cation, such as lithium, potassium or ammonium.

Alternatively, with respect to the reactions above, an organic amine may be used to neutralize the free acid form of the dye in place of the inorganic reagents mentioned. The amine contains up to three substituents of 1 to 3 alkyl(s) of 1 to 4 carbon atoms or alkanol(s) of 1 to 3 carbon atoms. Examples of such amines, include alkylamines such as triethylamine, propylamine, butylamine, N-methylpropylamine, N-methylbutylamine or dibutylamine. Alkanolamines may also be used, such as ethanolamine, N,N - dimethylethanolamine, N,N-diethylethanolamine, N-methyl- or N-ethyldiethanolamine, triethanolamine or dissopropanolamine. Mixtures of amines may also be used if desired.

The coupling components may be prepared by methods well known in the art, e.g. by reacting 3-amino-crotonitrile or cyanoacetone with p- or m - chlorophenyl-hydrazine under acid conditions.

The dyes of this invention have tinctorially strong, green-yellow shades. Their excellent exhaust and transfer properties under neutral to weakly acidic dyeing conditions produce level shades on BCF nylon of high fastness to light. Furthermore, they suffer no change of shade on the most basic forms of BCF nylon-6,6 currently used in styling yarns. Thus, the dyes are suitable for a wide variety of end-uses, including solid-shade or styling carpeting, apparel, upholstery, hosiery, parachute fabric and so on. Although poly(hexamethyleneadipamide) is the preferred substrate, other types of nylon may also be dyed therewith, such as poly(m-xylene adipamide), poly(xylylene sebacamide), polycaprolactam and the like.

The subject dyes may be applied to nylon by aqueous or pad-stream procedures. Included in the latter type are printing and continuous dyeing procedures.

EXAMPLES

The following examples are intended to be merely illustrative of the invention and not in limitation thereof. Unless otherwise indicated, all quantities are by weight.

Example 1.—Preparation of invention dye (p-chloro)

A slurry of 181 parts of 2,5-dichlorosulfanilic acid in 1500 parts of water and 174 parts of concentrated hydrochloric acid was cooled to 10° C. and 184 parts of 5 N-sodium nitrite solution were added slowly, with stirring. A positive nitrite test was maintained for a ½ hour, after which excess nitrite was destroyed with sulfamic acid yielding a diazonium salt.

This diazonium salt was then added over a period of 15 minutes to a stirred solution of 166 parts of 5-amino-1-(p-chlorophenyl)-3-methylpyrazole in 800 parts of water and 99 parts of concentrated hydrochloric acid at a temperature of 10° C. and a pH of <1. After stirring for 30 minutes, the pH was raised to 3.5 with sodium acetate. The reaction mass was stirred for an additional 1½ hours and the pH was raised to 8 with 30% sodium hydroxide solution. The solids were isolated by filtration, washed with 1000 parts of 10% sodium chloride solution and dried. Yield: 420 parts, having an absorptivity of 41.7 liters gm.$^{-1}$ cm.$^{-1}$ at 425 m$\mu$.

The solids were recrystallized from aqueous ethanol. The recovered product had the structure

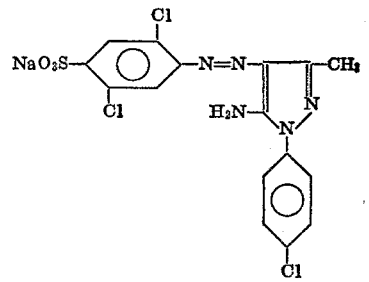

and possessed an absorptivity of 45.8 liters gm.$^{-1}$ cm.$^{-1}$ at 425 m$\mu$.

Found (percent): C, 40.1; H, 2.7; N, 14.1 Cl, 22.0; S, 6.9. Calcd. for $C_{16}H_{11}Cl_3N_5NaO_3S$ (percent): C, 39.8; H, 2.3; N, 14.5; Cl, 22.1; S, 6.6.

Example 2.—Preparation of invention dye (m-chloro)

The procedure of Example I was repeated, except that the coupling component used was 5-amino-1-(m-chlorophenyl)-3-methylpyrazole in place of the p-chlorophenyl isomer.

A yellow dye was obtained which had an absorptivity of 46.7 liters gm.$^{-1}$ cm.$^{-1}$ at 420 m$\mu$ and which had the structure:

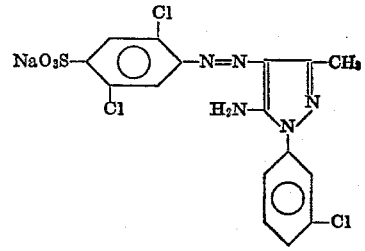

Example 3.—Aqueous dyeing procedure

In this example, the nylon substrate was BCF carpeting, made by tufting nylon parn onto a non-woven polypropylene backing. The BCF nylon yarn was 3700-denier, 204-continuous filaments, trilobal, jet-bulked yarn, melt-spun from poly(hexamethylene adipamide) flake.

Thirty parts of the carpeting were scoured for 20–30 minutes at 180° F. in 1000 parts of water containing

|  | Part |
|---|---|
| The condensation product of 20 moles of ethylene oxide with 1 mole of $C_{18}$ alcohol | 0.2 |
| Concentrated ammonium hydroxide | 0.6 |
| Sodium hydroxide | 0.15 |

The carpeting was rinsed thoroughly in water.

The carpeting was then added to a dyebath consisting of 1000 parts of water containing

|  | Part |
|---|---|
| Dodecyldiphenyl ether disulfonic acid, disodium salt | 0.85 |
| Acid dye | 0.03 |
| The condensation product of 10 moles of ethyl oxide with 1 mole of $C_{18}$ alcohol | 0.5 |
| Monosodium phosphate | 0.6 |

The pH was adjusted to 6.0 by adding acetic acid or disodium phosphate, as necessary.

The dyebath temperature was raised to 210° F. over 45 minutes and the dyeing continued for 1 hour. The bath was then dropped and the carpeting given a warm water rinse.

When the dyes of Examples 1 and 2 were each applied to nylon carpeting by the procedure described above, level, greenish-yellow shades of very good value were obtained. The lightfastness of the dyeings was excellent.

Example 4.—Dyeing of nylon styling carpeting

In this example, the carpet was multifiber BCF nylon yarn tufted onto a non-woven polypropylene backing. The carpet consisted of five bands, each one being six ends in width, prepared with the following poly(hexamethylene adipamides):

(a) cationic dyeable, 1300 denier, such as described in U.S. Pat. No. 3,184,436;
(b) light-dyeable, 3700 denier;
(c) medium-dyeable, 3700 denier;
(d) deep-dyeable, 3700 denier; and
(e) ultra-deep-dyeable, 3700 denier.

These are 204-continuous filaments, trilobal, jet-bulked yarns, melt-spun from the nylon flake.

Bleach: 100 parts of the five-banded carpeting were heated for 5 minutes at 80° F. in 4000 parts of water containing 4 parts of sodium perborate, 0.03 part of a sulfobetaine having the following structure:

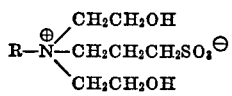

where

R = $C_{16}$ alkyl (30%)
   $C_{18}$ alkyl (30%)
   $C_{18}$ monounsaturated (40%), and 0.25 part of trisodium phosphate. The temperature was then raised to 160° F. for 15 minutes. The carpet was then rinsed in warm water at 100° F.

Dyeing: These 100 parts of carpet were next heated for 10 minutes at 80° F. in 4000 parts of water containing 0.25 part of the aforementioned sulfobetaine and sufficient monosodium phosphate to adjust the pH to 6.0–6.2. 0.1 part of the dye of Example 1 was added and the dyebath temperature raised at 2°–3° C. per minute to 208° F., which temperature was maintained for 1 hour. The carpet was rinsed and dried.

Pronounced "stepping" of the dye on the various bands was observerd. A visual estimate of the amount of dye on each of the bands gave the following results:

Cationic-dyeable nylon: none
Light-dyeable nylon: faint stain
Medium-dyeable nylon: light dyeing (1 part)
Deep-dyeable nylon: strong dyeing (9 parts)
Ultra-deep dyeable nylon: very strong dyeing (15 parts)

The shade of the dyeing on the ultra-deep dyeable nylon yarn was the same as that of a dyeing of comparable strength that was run in the same way on a separate swatch of the medium-dyeable nylon. This test indicates that the dye shows no shade instability on the basic ultra-deep dyeable nylon.

Example 5.—Application properties: Comparison of the dye of Example 1 with a commercial dye of the structure

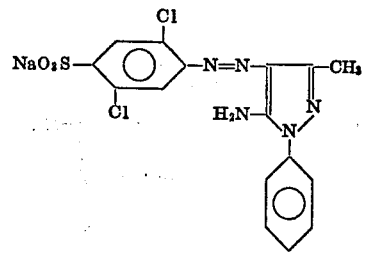

(A) Buildup: (1) Two skeins made of T–846 nylon were dyed in green shades of equal shade and strength by the method described in Example 3, using the following dyes:

|  | Percent O.W.F.[1] |
|---|---|
| (a) The dye of Example 1[2] | 0.45 |
| "Merpacyl" Blue 2GA | 0.05 |
| (b) The aforesaid yellow commercial dye[3] | 0.25 |
| "Merpacyl" Blue 2GA | 0.05 |

[1] O.W.F. = on weight of the fiber.
[2] 32% active ingredient.
[3] 60% active ingredient.

The blue dye was added to make the comparison of shade strength easier.

At the given dye concentrations, virtually complete exhaust of both dyes on the nylon substrate occurred.

(2) A third T–846 nylon skein was then dyed in the same manner, using

|  | Percent O.W.F. |
|---|---|
| The commercial yellow dye | 4.0 |
| "Merpacyl" Blue 2GA | 0.8 |

The weight of the two dyes in the dyebath as expressed by percent O.W.F. is 16 times that of the dyes utilized in A(1)(b) above. It would therefore be expected, by one skilled in the art, that if a fourth skein were dyed with the dyes of A(1)(a), and equal shade and strength to that of this third T–846 skein was desired, the weight of the dyes of A(1)(a) would likewise have to be increased by 16 times to a percent O.W.F. of 7.2% and 0.8% for the yellow and blue dye, respectively.

A fourth skein was in fact dyed with the dyes of A(1)(a) and the shade and strength did equal that of the third T–846 skein but the percent O.W.F. of the yellow dye of Example 1 required to accomplish this was only 4.75% O.W.F. Only about two-thirds of the expected amount of the dye of this invention was needed, thus demonstrating the significant superiority in buildup of the invention dye over the commercial yellow dye.

(B) Transfer: Two samples of polypropylene-backed T–846 nylon carpeting were dyed with 0.25% O.W.F. of the said commercial dye and 0.45% O.W.F. of the dye of Example 1, respectively, by the method of Example 3.

The dyeing procedure was repeated on two more undyed samples of nylon carpeting, except that in each case the dye in the bath was replaced by a piece of the dyed nylon carpeting described above, each piece of dyed nylon being equal in size to the undyed sample. When the dyeing procedure was complete, each pair of nylon carpet samples was dyed to equal shade depth, demonstrating that both yellow dyes display excellent transfer properties from the dyed nylon piece to the previously undyed nylon sample.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A green-yellow monoazo acid dye of the formula:

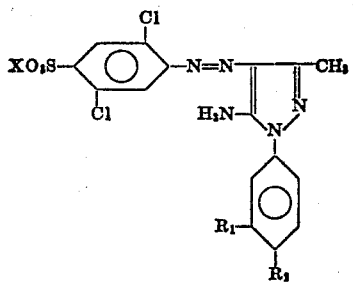

wherein X is H, Li, Na, K, ammonium or ammonium substituted by 1 to 3 alkyl of 1 to 4 carbon atoms or alkanol of 1 to 3 carbon atoms, and wherein one of $R_1$ an $R_2$ is Cl, the other being H.

2. A dye according to claim 1 having the formula:

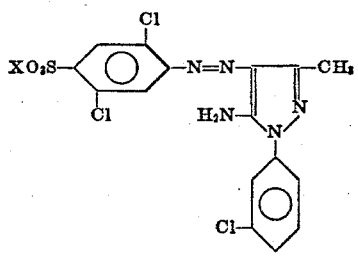

3. A dye according to claim 1 having the formula:

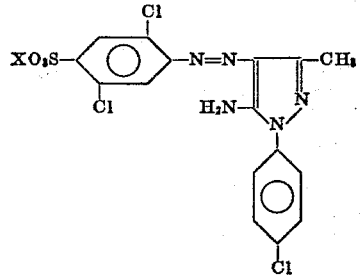

References Cited
UNITED STATES PATENTS

| | | | |
|---|---|---|---|
| 1,771,767 | 7/1930 | Bonhote | 260—163 |
| 2,443,226 | 6/1948 | Carson | 260—163 X |
| 2,721,111 | 10/1955 | Long et al. | 260—163 X |
| 2,728,762 | 12/1955 | Heyna et al. | 260—163 |
| 2,921,061 | 1/1960 | Ackermann et al. | 260—147 |
| 3,356,673 | 12/1967 | Favre et al. | 260—163 |
| 3,344,133 | 9/1967 | Bossard et al. | 260—163 |

FLOYD DALE HIGEL, Primary Examiner

U.S. Cl. X.R.

8—41 R, 41 B; 117—138.8 N